Patented Aug. 18, 1942

2,293,514

UNITED STATES PATENT OFFICE 2,293,514

TREATMENT OF OLEORESIN WITH OXALIC ACID

Donald A. Lister, Brunswick, Ga., assignor to Hercules Powder Company, Wilmington, Del., a corporation of Delaware No Drawing. Application September 6, 1940, Serial No. 355,604

9 Claims. (Cl. 260—109)

This invention relates to a process of obtaining a highly purified rosin from crude pine oleoresin.

Crude pine oleoresin is obtained by scarifying the bark of the pine tree and catching the exudate in a suitable container. This material as collected from the forest is a viscous semi-crystalline mass contaminated with sand, wood chips, particles of bark and various other kinds of foreign matter. This crude oleoresin is exceedingly unstable in its chemical composition and from the time it exudes from the trees it is continually undergoing various chemical changes. It is also acid in its action and whenever it comes in contact with metals, especially iron, it tends to pick up still further impurities. When this oleoresin is subjected to treatment for the recovery of rosin these various contaminating agents remain in the rosin and a dark colored rosin is obtained which is at a serious disadvantage today because paleness in color is a necessary characteristic of rosin for the majority of uses.

In order to make a more merchantable, higher quality product, it has been the practice to treat the rosin remaining after the volatile matter has been removed from the oleoresin with various agents for the removal of the contaminating bodies. While causing some improvement in color, the rosin so produced still has a much darker color than is desirable.

The object of the present invention is to provide a process for the refining of crude pine oleoresin whereby there is obtained rosin of a color greatly improved over that heretofore obtainable by chemical treatment of the rosin derived from the oleoresin.

Another object is to devise a process whereby rosin of a given lightness of color is obtained more effectively and more economically than heretofore.

Other objects will more fully and hereinafter appear.

I have discovered that the chemical refining of crude pine oleoresin before heating or "stilling" is unexpectedly more effective than chemical treatment of rosin recovered from the crude oleoresin. I have further discovered that oxalic acid either in the anhydrous or in the aqueous form is a very effective refining agent for carrying out this purification.

In accordance with the present invention the crude pine oleoresin which has not been previously heated to a materially elevated temperature is treated directly with oxalic acid. The action of oxalic acid on the oleoresin is to combine with iron and other metals present in the oleoresin and to otherwise lighten the color of the rosin present in the oleoresin.

In this specification and in the claims appended hereto, the term "materially elevated temperature" denotes a temperature such as to cause discoloration of the oleoresin or rosin contained therein or fixation of color therein against removal in accordance with the present invention. I prefer to treat crude oleoresin which has not been previously heated, although I may treat oleoresin which has previously been heated to not in excess of about 70° C. to about 80° C., and preferably not in excess of about 50° C. Heating of the oleoresin to or above such temperatures after, or at the earliest simultaneously with, the chemical refining in accordance with the present invention, may be effected without objectionable consequence.

In proceeding in accordance with my invention the crude pine oleoresin as obtained from the forest composed approximately, of say three parts of rosin to one part of turpentine, containing amounts of foreign material or trash ranging from about 0.5% to about 5.0% of the weight of the oleoresin and containing suspended water to the extent of about 4% to about 15% by weight, may be dissolved by suitable mechanical agitation in a water immiscible organic solvent such as gasoline or petroleum naphtha, benzol, toluol, wood or gum turpentine, or other inert volatile organic solvent, followed by settling and separation of the solution layer from the water layer and any extraneous insoluble matter. The rosin concentration in the resulting solution may be adjusted to any convenient amount, but preferably is not over 50% by weight. I have found that a 25–30% is a convenient concentration. If turpentine is used as the solvent it will be found that the solution is somewhat more viscous than where benzol or gasoline is the solvent so that greater dilution in the case of turpentine may be desirable than in the case of benzol or gasoline.

Although any of the water immiscible solvents referred to above is applicable in the process, and gives a rosin of substantially the same degree of refinement, I have found that gasoline or petroleum naphtha is preferable because such a solvent possesses practical advantages over the others such as low cost, ease of separation from the aqueous acid layer and greater ease in the subsequent operation of water washing where that step is employed. By "gasoline or petroleum naphtha" I mean a mixture of petroleum hydrocarbon which is liquid at ordinary temperatures, which has an initial boiling point of from about 70° F. to about 140° F., and an end boiling point of from about 350° F. to about 450° F., which fairly gradually covers such a range, and has a gravity of from about 45° Bé. to about 65° Bé. I prefer to use so-called "narrow range" gasoline or petroleum naphtha having a boiling point ranging from about 200° F. to about 270° F.

After dilution of the crude pine oleoresin to a suitable concentration, it will be found that the associated extraneous matter and water separate to a great extent from the solution, the upper layer containing the oleoresin in the solvent while the lower layer is composed of water and the extraneous matter. The amount of the lower layer is of course dependent upon the amount of the materials in the original oleoresin. Some of the lighter impurities such as bark, chips, etc. float upon the surface and are removed together with the extraneous matter in the lower layer by filtration. The filtered solution on standing settles free of suspended water which may then be removed in a suitable manner. Although this water is not unduly objectionable in the subsequent refining process, it does interfere where the refining process is carried out under substantially anhydrous conditions as with anhydrous oxalic acid, and it does contain some soluble organic matter. It is preferred to remove such water from the oleoresin solution by separation of the aqueous layer from the resinous solution layer, before proceeding with the treatment.

The treatment of the oleoresin may be either at room temperature or at an elevated temperature up to the refluxing temperature of the mixture which depends upon the composition of the mixture. Where treatment at temperatures higher than the refluxing temperature is desired, it may be carried out under superatmospheric pressure.

The oxalic acid treating agent may be in either solid or liquid form. When solid oxalic acid is used it is usually in the commercial form of the crystalline dihydrate with two molecules of water of crystallization, although the anhydrous form may be used. Where liquid oxalic acid is used, it is preferably in the form of an aqueous solution of any desired concentration, for example from about 0.1% to about 60% by weight depending upon the treating temperature which determines the solubility of the oxalic acid in water.

Where solid oxalic acid is used, it is preferable to carry out the treatment at the reflux temperature of the mixture although a higher temperature ranging as high as about 125° C., or thereabove to 160° C., or even higher may be employed. Treatment at the reflux temperature using a reflux condenser is preferred. The reflux temperature will depend upon the organic solvent used to dilute the oleoresin, the concentration of the oleoresin solution, etc. For example with a crude oleoresin solution, containing 30% by weight of rosin, in benzene, the reflux temperature is about 87° C., in narrow range gasoline 107° C., toluene 117° C., and in gum turpentine 157° C.

It is preferred to use a solvent and concentration such that the refluxing temperature in dry oxalic acid refining is not above about 120° C. and preferably in the neighborhood of 100° C. or under, say below about 110° C. since the lower the refluxing temperature in general the greater the degree of refining. Accordingly the use of temperatures above 120° C. is not preferred, and the use of pressure to bring about an increase in the temperature of treatment is not ordinarily necessary.

Refluxing at temperatures above 100° C. say up to 120° C. may be preceded by heating at a temperature in the neighborhood of 100° C. or slightly thereabove to remove any water present in the mixture such as water introduced by the use of oxalic acid dihydrate.

Preferably a blanket of carbon dioxide or other inert gas is maintained over the mixture during the treatment to prevent oxidation, especially when the treatment is conducted at temperatures above 100° C.

Where oxalic acid is used in liquid form, it is preferred to use an aqueous solution, since it has been found that water exerts a refining action on the oleoresin in addition to that exerted by the oxalic acid, and that the presence of water facilitates the obtaining of an intimate mixture by reduction in viscosity of the mixture. Where water is present the treatment will usually be conducted at a temperature ranging from atmospheric to the refluxing temperature of the mixture, the higher temperatures being preferred. Again the treatment may be conducted at temperatures above the refluxing point if the mixture is maintained under suitable pressure. Where aqueous oxalic acid is used the concentration will depend upon the temperature. Good results have been obtained using oxalic acid in a concentration ranging from about 0.1% up to about 12% of the dihydrate by weight, 12% being about the maximum solubility at room temperature. Higher concentrations, say up to 30–60% by weight are possible when using hot water or carrying out the treatment at elevated temperatures since such temperatures increase the water solubility of the oxalic acid.

The amount of oxalic acid relative to rosin present in the oleoresin solution may vary within wide limits, for example from about 0.05% to about 150% by weight of the dihydrate based on the weight of rosin, depending upon the conditions of the treatment, the amount of color bodies in the oleoresin, and numerous other factors, but preferably between about 0.05% and about 5% by weight on the weight of rosin, especially when the treatment is carried out with solid oxalic acid under substantially anhydrous conditions.

Following the treatment for the desired length of time, the mixture may be cooled and the rosin recovered therefrom in any desired manner with or without removal of the oxalic acid therefrom.

Where aqueous oxalic acid is used, the mixture may be allowed to undergo layer formation, whereupon the aqueous layer is separated, the resinous solution washed with water to remove traces of oxalic acid and evaporated to recover the purified rosin. Where solid oxalic acid is used, the mixture may be filtered to remove undissolved oxalic acid and insoluble oxalates, whereupon the solution is evaporated to recover the rosin. If desired the solution of the treated oleoresin may be dissolved in naphtha to effect precipitation of iron salts or the like, followed by filtration from insoluble or precipitated material prior to evaporation of solvent. If desired the filtered solution may be washed with water before evaporation.

If desired, under certain circumstances, solid or aqueous oxalic acid may be added to the crude oleoresin solution in the still or immediately prior to its introduction to the still, relying upon the heat and agitation of the mixture during distillation (for example dry or steam distillation) to effect refining as the distillation of the turpentine occurs. Since this procedure leaves the oxalic acid in the rosin, it is frequently undesirable, although it is satisfactory where extremely small amounts of oxalic acid are used, say about 1% or less based on the weight of rosin. It is preferable to preliminarily cleanse the oleoresin by dissolution in a solvent as before, although fairly good results may be obtained by adding the oxalic acid to the conventional crude still stock and distilling in its presence.

The treatment may be carried out several times in succession. For example where aqueous oxalic acid is used the water layer may be drained off after each treatment, followed by adding fresh distilled water solution of oxalic acid and washing or refluxing with the fresh washing liquid.

Practical embodiments of the invention, and the Lovibond color determination of the rosin produced thereby, are illustrated in the following examples. The oxalic acid referred to is the dihydrate.

EXAMPLE 1

Two hundred parts by weight of a 30% rosin solution of crude pine oleoresin in petroleum naphtha, which had been filtered and water washed, were admixed with two hundred parts by weight of distilled water and 0.2 part by weight of oxalic acid. The mixture was refluxed for 2 hours. The aqueous layer was then drawn off and another wash of two hundred parts by weight of water and 0.2 part by weight of oxalic acid was added. This mixture was refluxed for 2½ hours. The acid water layer was again separated, the rosin solution given three washes with distilled water, and the rosin recovered from the solution. The recovered rosin had a color of 28 amber or N grade whereas the original crude oleoresin contained rosin of a color grade of 40 amber plus 1.25 red or K grade.

EXAMPLE 2

One hundred fifty parts by weight of a 30% rosin solution of crude oleoresin in narrow range gasoline was mixed with 200 parts by weight of distilled water and 0.2 part by weight of oxalic acid. The mixture was refluxed for 2½ hours whereupon the water layer was separated and a similar wash of 200 parts by weight of water and 0.2 part by weight of oxalic acid was added, the mixture again refluxed for 2½ hours, the oleoresin solution separated, washed three times with water, and the rosin recovered. The product had a color of 28 amber or an N grade whereas the original had a color of 40 amber plus 2.25 red or a K grade.

EXAMPLES 3–7

Crude pine oleoresin was dissolved in gum turpentine, the water separated, and the resulting solution filtered to remove trash, yielding a 50% solution of rosin in turpentine. Lots of the solution thus obtained were agitated at 150° C. with solid oxalic acid under the conditions indicated in the following Table I. No dilution of the acid with water was made. A blanket of carbon dioxide was employed over the mixture to prevent oxidation. Following the treatment the mixture was distilled under reduced pressure to remove the turpentine. In the cases indicated the treated oleoresin solution prior to distillation of turpentine was dissolved in V. M. & P. naphtha and filtered to remove oxalic acid and insoluble salts thereof formed during the treatment. The extent of refining is also indicated in Table I. Rosin recovered directly from the 50% oleoresin solution had a color grade of H.

*Table I*

| Example No. | 50 percent oleoresin solution— | Oxalic acid— | Oxalic acid on rosin | Temp. | Time | Color grade of recovered rosin |
|---|---|---|---|---|---|---|
| | Parts by wt. | Parts by wt. | Percent | °C. | Minutes | |
| 3 | 100 | 0.05 | 0.1 | 150 | 15 | K |
| 4 | 100 | 0.05 | 0.1 | 150 | 30 | K+ |
| 5 [1] | 100 | 0.05 | 0.1 | 150 | 45 | K |
| 6 | 60 | 0.06 | 0.2 | 150 | 15 | K |
| 7 [1] | 60 | 0.06 | 0.2 | 150 | 45 | I |

[1] Oleoresin solution dissolved in V. M. & P. naphtha following treatment, then filtered from precipitated material, and then evaporated.

EXAMPLES 8–11

A 25% solution of crude oleoresin in turpentine which had been cleansed by water washing and filtration as described above was washed with aqueous oxalic acid under the conditions indicated in the following Table II. The washing was continued for ten minutes whereupon the aqueous layer was separated from the oleoresin solution, the solution water washed, and the solvent evaporated under reduced pressure to yield the refined rosin. The color grade of the refined rosin is also indicated in Table II. Rosin recovered directly from the 25% oleoresin solution had a color grade of H.

*Table II*

| Example No. | 25 percent oleoresin solution | Aqueous oxalic acid | Conc. of aqueous oxalic acid (dihydrate) | Oxalic acid on rosin | Temp. | Color grade of recovered rosin |
|---|---|---|---|---|---|---|
| | Parts by wt. | Parts by wt. | | Percent | °C. | |
| 8 | 80 | 204 | 5 | 50 | 25 | M+ |
| 9 | 80 | 204 | 5 | 50 | 50 | M+ |
| 10 | 80 | 208 | 12 | 125 | 25 | M+ |
| 11 | 80 | 208 | 12 | 125 | 50 | N |

EXAMPLES 12–15

Crude pine oleoresin yielding a D grade of rosin was dissolved to a 30% concentration of rosin in the respective solvents set forth in Table III, settled, water separated, and filtered. Oxalic acid dihydrate was then added in the proportion indicated, and the mixture refluxed for the time indicated; cooled under carbon dioxide and filtered.

*Table III*

| Solvent used | Oxalic acid on rosin basis | Reflux | Reflux time | Refined rosin color grade |
|---|---|---|---|---|
| | Percent | Temp. °C. | | |
| Narrow range gasoline | 0.33 | 107 | 15 min. | 23AWW |
| Benzene | 0.50 | 87 | 1½ hrs. | 26AWG |
| Toluene | 0.50 | 117 | 30 min. | 40AN |
| Gum turpentine | 0.45 | 157 | 30 min. | 40A+9RH |

These results show that in the dry oxalic acid refining, reflux temperatures near 100° C. or under should be used.

EXAMPLES 16–18

Solid oxalic acid (the dihydrate) was added directly to crude pine oleoresin. The oleoresin had not been first dissolved in the solvent, settled free of water, and filtered as in the preceding examples, but was merely the crude oleoresin as obtained from the forest with the exception that large particles of foreign matter had been manually removed therefrom. The oxalic acid was added in amounts indicated in Table IV. Thereupon, the mixture was steam distilled to remove the turpentine and to leave a residue of purified rosin. The oleoresin employed was one which yielded directly a rosin of a D grade or 80 Amber +215 Red.

*Table IV*

| Weight of oxalic acid | Weight of crude oleoresin | Color of rosin |
|---|---|---|
| Grams | Grams | F. |
| 0.1 | 98 | |
| 0.4 | 106 | K (40 amber+4.0 red). |
| 0.8 | 97 | K (40 amber+3.0 red). |

It will be seen that solid oxalic acid is very effective as a refining agent when added to crude oleoresin followed immediately by recovery of the rosin by steam distilling off the turpentine in the usual manner.

From the foregoing it will be seen that chemical refining of crude oleoresin with oxalic acid before subjecting the oleoresin to a materially elevated temperature results in the production of rosin of good color grade more economically and more expeditiously than by the prior processes of refining finished rosin.

It will be understood that the details and examples hereinbefore set forth are illustrative only and that the invention as broadly described and claimed is in no way limited thereby.

What I claim and desire to protect by Letters Patent is:

1. The process of producing a high grade, pale rosin from crude pine oleoresin which has not been previously heated to a materially elevated temperature which comprises dissolving said oleoresin in a volatile organic solvent and forming therein a solution essentially free from aqueous phase, dirt and the like, treating the solution with a chemical refining agent consisting essentially of oxalic acid, and evaporating volatile matter from the treated solution to leave a residue of purified high grade rosin.

2. The process of producing a high grade, pale rosin from crude pine oleoresin which has not been previously heated to a materially elevated temperature which comprises dissolving said oleoresin in a water-immiscible organic solvent and forming therein a solution essentially free from aqueous phase, dirt and the like, treating the solution with a chemical refining agent consisting essentially of oxalic acid, and evaporating volatile matter from the treated solution to leave a residue of purified high grade rosin.

3. The process of producing a high grade, pale rosin from crude pine oleoresin which has not been previously heated to a materially elevated temperature which comprises dissolving said oleoresin in a water-immiscible organic solvent and forming therein a solution essentially free from aqueous phase, dirt and the like, treating the solution with a chemical refining agent consisting essentially of solid oxalic acid, and evaporating volatile matter from the treated solution to leave a residue of purified high grade rosin.

4. The process of producing a high grade, pale rosin from crude pine oleoresin which has not been previously heated to a materially elevated temperature which comprises dissolving said oleoresin in a water-immiscible organic solvent and forming therein a solution essentially free from aqueous phase, dirt and the like, treating the solution with a chemical refining agent consisting essentially of oxalic acid under substantially anhydrous conditions, and evaporating volatile matter from the treated solution to leave a residue of purified high grade rosin.

5. The process of producing a high grade, pale rosin from crude pine oleoresin which has not been previously heated to a materially elevated temperature which comprises dissolving said oleoresin in a water-immiscible organic solvent and forming therein a solution essentially free from aqueous phase, dirt and the like, treating the solution with a chemical refining agent consisting essentially of oxalic acid under substantially anhydrous conditions, the amount of said oxalic acid calculated as dihydrate falling within the range of from about 0.05% to about 5% by weight based on the weight of rosin in said oleoresin solution, and evaporating volatile material from the treated solution to leave a residue of purified high grade rosin.

6. The process of producing a high grade, pale rosin from crude pine oleoresin which has not been previously heated to a materially elevated temperature which comprises dissolving said oleoresin in a water-immiscible organic solvent forming therein a solution containing not more than about 50% of rosin by weight and essentially free from aqueous phase, dirt and the like, treating the solution with a chemical refining agent consisting essentially of oxalic acid under substantially anhydrous conditions, the amount of said oxalic acid calculated as dihydrate falling within the range of from about 0.05% to about 5% by weight based on the weight of rosin in said solution, at the refluxing temperature of the mixture, and evaporating volatile matter from the treated solution to leave a residue of purified high grade rosin.

7. The process of producing a high grade, pale rosin from crude pine oleoresin which has not been previously heated to a materially elevated temperature which comprises dissolving said oleoresin in a water-immiscible organic solvent and forming therein a solution essentially free from aqueous phase, dirt and the like, treating the solution with an aqueous solution of oxalic acid, and evaporating the treated oleoresin solution to recover a residue of purified high grade rosin.

8. The process of producing a high grade pale rosin from crude pine oleoresin which has not been previously heated to a materially elevated temperature which comprises dissolving said oleoresin in a water-immiscible organic solvent and forming therein a solution essentially free from aqueous phase, dirt and the like, treating the solution with an aqueous solution of oxalic acid of a concentration falling within the range of about 0.1% to about 12% oxalic acid dihydrate by weight, the amount of said solution being such that the amount of oxalic acid calculated as dihydrate falls within the range of from about 0.05% to about 150% by weight based on the weight of rosin in said oleoresin solution, and evaporating volatile matter from the treated oleoresin solution to leave a residue of a purified high grade rosin.

9. The process of recovering a high grade, pale gum rosin from crude pine oleoresin which has not been previously heated to a materially elevated temperature which comprises dissolving said oleoresin in a water-immiscible volatile organic solvent separating the resulting solution from the aqueous phase, dirt and other extraneous matter, said solution containing not more than about 50% by weight of rosin, refluxing said solution with a chemical refining agent consisting of from about 0.05% to about 5% by weight of oxalic acid based on the weight of rosin in said solution at a temperature below about 110° C., and evaporating the volatile matter from the treated solution to leave a residue of purified high grade gum rosin.

DONALD A. LISTER.